Nov. 26, 1963　　　　　E. MEYER　　　　　3,112,420
ROTOR CONSTRUCTION FOR WATERWHEEL DRIVEN ELECTRICAL GENERATOR
Filed Nov. 14, 1960
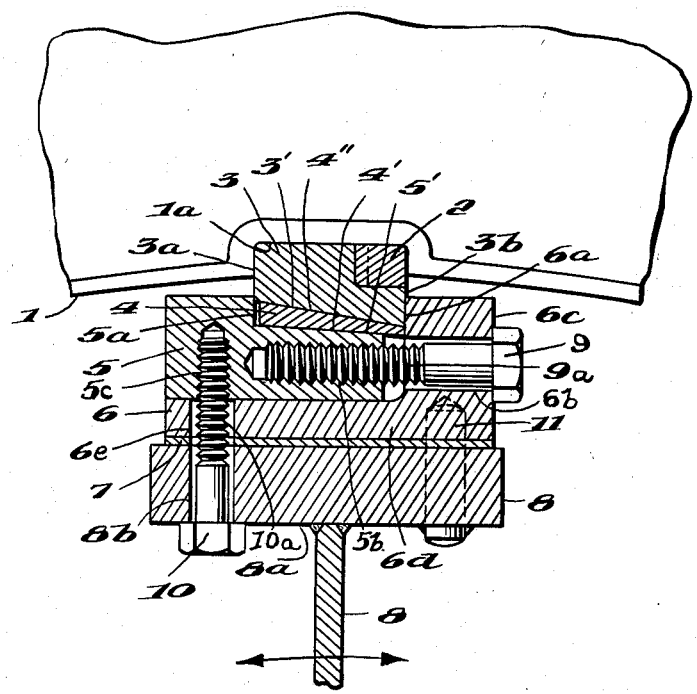
INVENTOR
Eugen Meyer
BY *Pierce, Scheffler & Parker*
ATTORNEYS United States Patent Office 3,112,420
Patented Nov. 26, 1963

3,112,420
ROTOR CONSTRUCTION FOR WATERWHEEL DRIVEN ELECTRICAL GENERATOR
Eugen Meyer, Baden, Aargau, Switzerland, assignor to Aktiengesellschaft Brown, Boveri & Cie, Baden, Switzerland, a joint-stock company
Filed Nov. 14, 1960, Ser. No. 68,899
Claims priority, application Switzerland Nov. 26, 1959
5 Claims. (Cl. 310—261)

The present invention relates to the construction of waterwheel driven electrical generators for hydroelectric power stations and more particularly to an improved construction for the rotor element of such a generator which is driven by the water turbine and is provided with the necessary field poles and field winding to establish the rotary field.

The rotary field elements of waterwheel generators are usually very large in size since they rotate at a relatively slow speed and hence involve not only large dimensions but also great mass which makes it most impractical for the rotor elements to be manufactured and shipped in a completely assembled manner. Rather, the customary practice is to manufacture and ship the various parts of the rotor disassembled and to assemble them at the hydroelectric power plant. The rotary field element therefore usually comprises a spider consisting of a hub adapted to be mounted on the usually vertical water turbine shaft and a plurality of radially extending arms or spokes, a rim attached to the outer ends of the spider arms, and field poles mounted on the rim. At the assembly point, the rim is mechanically secured upon the spider. This mechanical connection between rim and spider must be such that the circumferential forces are transmitted by the turbine torque in an absolutely safe manner from the spider to the rim. Moreover, the rim must remain accurately centered on the spider throughout the entire speed range of the generator. It is further desirable, for example, to be able to separate the rim from the spider when disassembling the turbine wheel of a vertical turbine so that the spider, shaft, and turbine wheel can be disassembled inside the rim. The rim with the field poles is adjusted in this case to the supporting spindles of the generator. A connection which can be rapidly disengaged by the machine personnel themselves thus permits one to provide a crane which has to be dimensioned only for the weight of the heaviest parts such as the rotor rim, rotor spider, shaft and turbine wheel, instead of for the entire rotary field element.

The manner in which the rims are secured to the spider is thus of great importance in fulfilling the abovementioned objectives. It is known, for example, to attach the rims to the spider by shrinking. This mode of attachment requires, however, the application of suitable heating elements and a corresponding heating plant. It is also known to wedge the rims primarily in the cold state by wedges parallel to the axis and which are located between the rim and spokes of the spider. With rims which have a considerable dimension in the direction of the axis, the length of the wedges is so great, however, that it becomes practically impossible to remove the wedges after extended operation, due to corrosion effects.

The object of the present invention is to provide an improved arrangement for securing the rim to the spider which makes it possible to thereafter remove the rim from the spider whenever necessary all without any difficulty or great effort or heating. This result is attained in accordance with the invention in that the rim is secured by means of at least one wedging having a slight taper and extending in a circumferential direction.

The foregoing objects and advantages will become more apparent from the following detailed description of one embodiment of the invention and from the accompanying drawing which shows in section a portion of the spider and rim together with the improved wedge construction which interconnects these two elements of the rotary field assembly.

Referring now to the drawing, a circumferential portion of the rim element of the rotor on which the field poles are mounted is indicated at 1, the circumferential portion depicted being that adjacent to one radially extending arm 8 of the spider. The remaining arms of the spider and the connections between them and the appertaining circumferential portions of the rim have not been included in the drawing since they are similar in construction to the particular one illustrated. Also, the hub of the spider which is mounted on the usually vertical turbine shaft so as to be driven by the latter as well as the field pole structure itself have not been included in the drawings in the interest of simplification and moreover because such parts of the complete rotary field assembly are not themselves related to the present invention which, as mentioned above, is directed to an improved arrangement for securing the rim to the arms of the spider. However, the double-headed arrow indicates the two possible directions, clockwise or counterclockwise in which the rotary field assembly is adapted to rotate, the axis of rotation being, of course, normal to the plane of the drawing.

A stationary wedge element 3, having a taper 3′ extending in the circumferential direction of the rim is secured within a groove 1a of the rim by means of a driving key 2. A second intermediate wedge 4 is also provided, this wedge being of the double type having tapered surfaces 4′ and 4″ on opposite faces thereof also extending in the circumferential direction of the rim. The tapered surface 4″ which matches the taper 3′ on the wedge 3 and lies in contact with the latter has a comparatively steep slope whereas the oppositely disposed tapered surface 4′ has a comparatively slight slope. The tapered surface 4′ lies in contact with a complementary tapered surface 5′ of a wedge securing element 5 and which also includes a shoulder 5a adapted to engage an end face 3a of stationary wedge 3. The securing element 5 is also provided with a threaded bore 5b extending generally parallel with the wedging surface 5′ for receiving the threaded portion 9a of a stud bolt 9, and a second threaded bore 5c extending normal to bore 5b for receiving the threaded portion 10a of a stud bolt 10.

A second securing element 6 is fixedly secured on the outer end of spider arm 8 by means of a dowel 11, and an exchangeable insert or shim 7 of selected thickness is placed between the element 6 and the arm 8. This shim 7 determines the thickness of the wedge joint. The securing element 6 is provided with a shoulder 6a adapted to engage the opposite end face 3b of the stationary wedge 3, a bore 6b in alignment with the threaded bore 5b through which the shank of stud bolt 9 is passed, the head of the latter bearing against the end face 6c of the securing element 6, and a longitudinally extending portion 6d having one face thereof in engagement with one face of shim 7 and the opposite face in engagement with the underface of the securing element 5. The longitudinally extending portion 6d is also provided with a bore 6e through which is passed the threaded end of another stud bolt 10, the head of bolt 10 engaging a surface 8a of the spider arm 8 and the bolt 10 passing through a bore 8b provided in the spider arm 8. It will be noted that the bores 6e, 8b are somewhat greater in diameter than the shank of stud bolt 10 in order to permit the securing member 5 to be moved through a sufficient distance to tighten the wedge.

With the various parts assembled in the manner indicated in the drawing but with bolt 10 removed, the desired wedging action between the spider arm 8 and the appertaining circumferential portion of the rim 1 in radial alignment therewith is effected by tightening bolt 9 so as to draw the securing element 5 towards the right as viewed in the drawing. The tapered surface 5' functions as a driving wedge with slight slope against the complementary tapered surface 4' of wedge 4 which transmits its force in a radial direction outward through the stationary wedge 3 to rim 1. The wedging force reaches an upper maximum limit as soon as the shoulder 5a engages the end face 3a of wedge 3. Transmission of torque from the spider arm 8 to the rim 1 is effected in a counterclockwise direction of rotation over the dowel pin 11, securing element 6 and wedge 3, and in a clockwise direction of rotation over dowel pin 11, stud bolt 9, securing element 5, wedge 3 and driving key 2.

After the stud bolt 9 has been drawn up a sufficient distance to tighten the wedge to the extent desired, stud bolts 10 are then inserted at both sides of the arm axis and tightened so as to secure the elements 5, 6 and 7 relative to the spider arm 8 so that they will not become displaced at the runaway value of the generator at which the rim 1 with the elements 3, 2 and 4 become detached from the element 5, due to the increased centrifugal force.

In order to disengage the wedge joint between each spider arm 8 and rim 1, releasing screws (not illustrated) are provided to take the place of the stud bolts 9. After the bolts 9 and 10 associated with the several wedging organizations arranged around the internal periphery of rim 1 at the spider arms 8 have been removed, these releasing screws are inserted into the bores 6b and caused to press against the securing elements 5 as they are screwed in, thus forcing the elements 5 in the reverse direction, i.e. to the left, so that the intermediate wedges 4 which are each easily disengaged at the steep tapered surface 4" also move back with the securing elements 5. After this very simple disengaging process, the rim 1 can be easily removed from the spider arms 8. The releasing screws for releasing the wedged joints can also be fitted into guide holes (not illustrated) in the securing elements 6. In this case, such holes must be provided with a thread matching the threads on the releasing screws.

The embodiment of the invention which has been described includes the intermediate wedge which has two different wedge tapers in a circumferential direction of the rim, namely, a slight taper 4' by means of which, and with relatively little effort, a very great wedging effect is achieved during the assembly of the rim on the spider, and a relatively steep taper 4" with which the wedge connection can be easily disengaged and corrosion of the wedge is positively avoided.

In those cases where the necessity for an easy removal of the rim from the spider can be dispensed with, a more simplified arrangement for securing the rim to the spider is possible in accordance with the invention by using only one wedge joint extending in the circumferential direction of the rim. In this case, the intermediate wedge 4 is omitted, and the wedging is effected directly between a single wedge similar to wedge 3 and securing element 5. The wedge 3 construction would then be modified to provide a slight taper corresponding to the taper 4' on wedge 4 and which would then engage the corresponding slight taper 5' on the securing element 5.

In conclusion, while I have described and illustrated one practical embodiment for a wedge joint in accordance with the invention, it is to be understood that various minor modifications in construction and arrangement of the component parts may be made without, however, departing from the spirit and scope of the invention as defined in the appended claims.

I claim:
1. In a rotor construction for a waterwheel driven generator which includes a spider having radially extending arms on which a rim is located, means for securing each spider arm to the rim comprising at least one wedge element inserted between said arm and the appertaining circumferential portion of said rim, said wedge element extending in the circumferential direction of said rim and being provided with a slight taper in such direction.

2. The invention as defined in claim 1 and which includes a plurality of wedges, a first one of said wedges being stationary and being secured to said rim, a second one of said wedges including a pair of oppositely disposed tapered surfaces, one of said tapered surfaces having a comparatively steep slope and being engaged with a correspondingly tapered surface on said first wedge and the other tapered surface having a comparatively slight slope and being engaged with a correspondingly tapered surface on a third wedge which is movable as related to said spider arm in the direction of the circumference of said rim.

3. The invention as defined in claim 2 wherein the transmission of torque between said spider and rim is effected by means of securing elements which partly surround said second wedge and which are connected with each other and with said spider arm by means of bolts, one of said securing elements being secured in fixed relation to said spider arm and the other of said securing elements including said third wedge.

4. In a rotor construction for a waterwheel driven generator which includes a spider having radially extending arms on which a rim is located, means for securing each spider arm to the rim comprising a first wedge having a wedging surface of comparatively steep slope, means fixing said first wedge in a groove in said rim and with the wedging surface extending in the circumferential direction of said rim, an intermediate wedge having oppositely disposed wedging surfaces also extending in the circumferential direction of said rim, one of said wedging surfaces matching the wedging surface of said first wedge and being engaged therewith and the other of said wedging surfaces having a comparatively slight slope, a pair of securing elements, means securing a first one of said securing elements to said spider arm in a stationary manner, said first securing element including a shouldered portion engaged with an end face of said first wedge and a bolt extending therethrough for threaded connection with a threaded bore in the second of said securing elements for drawing said second securing element towards said first securing element, said second securing element including a shouldered portion engageable with an opposite end face of said first wedge and also including a wedging surface matching the slightly sloped wedging surface on said intermediate wedge and being engaged therewith whereby to effect said wedging connection between said spider arm and said rim as said second securing element is drawn in the direction of said first securing element.

5. The invention as defined in claim 4 and which further includes a second stud bolt which passes through bores in said spider arm and said first securing element into a threaded bore in said second securing element for rendering said second securing element immovable relative to said spider arm after said wedges have been tightened by movement of said second securing element.

References Cited in the file of this patent
UNITED STATES PATENTS

| | | |
|---|---|---|
| 461,795 | Lundell | Oct. 20, 1891 |
| 2,986,665 | Isaacson | May 30, 1961 |